UNITED STATES PATENT OFFICE.

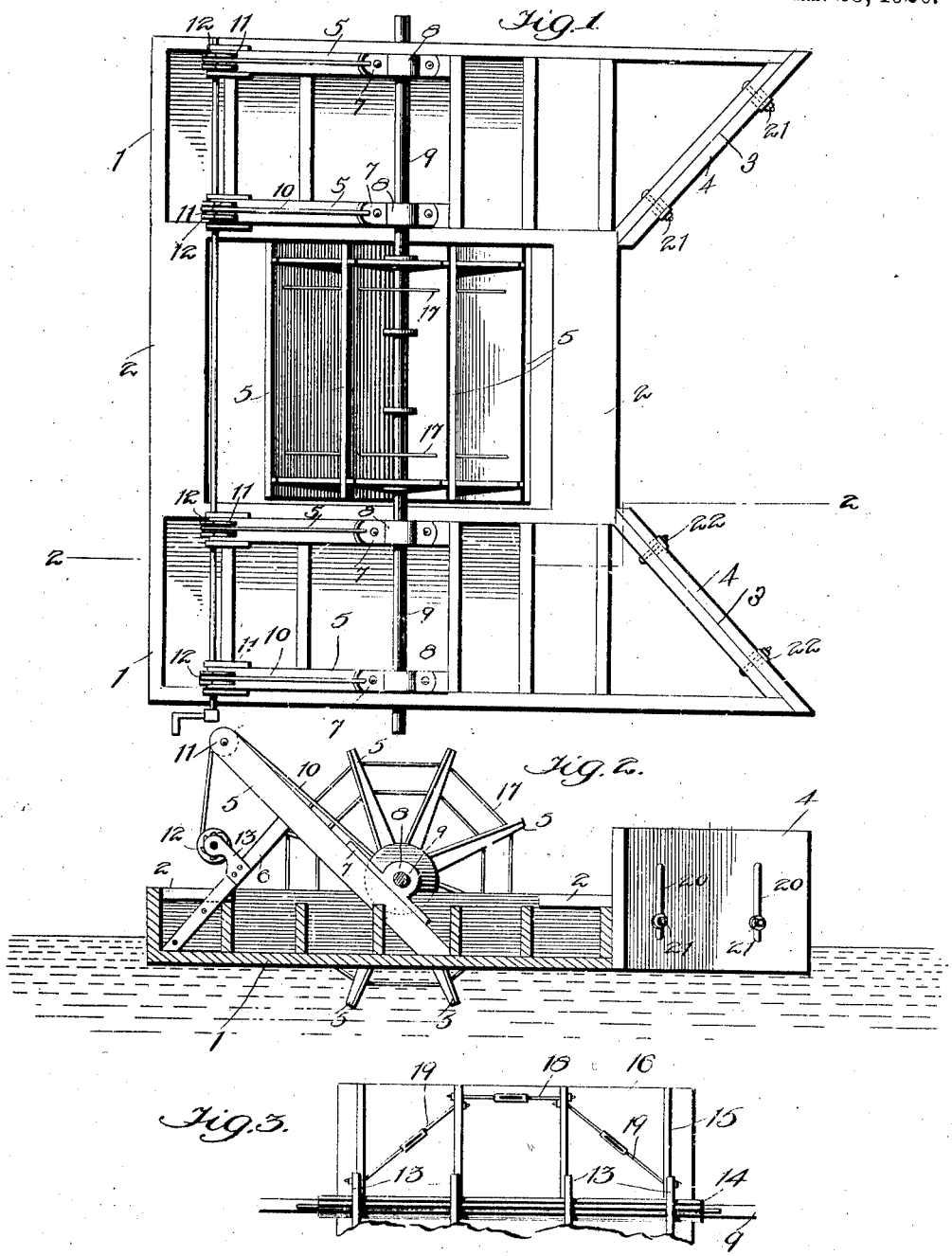

HENRY C. CANADAY, OF MAYFIELD, KENTUCKY.

CURRENT-MOTOR.

1,334,595.  Specification of Letters Patent.  Patented Mar. 23, 1920.

Application filed July 10, 1918. Serial No. 244,300.

*To all whom it may concern:*

Be it known that I, HENRY CLAY CANADAY, a citizen of the United States, and a resident of Mayfield, in the county of Graves and State of Kentucky, have invented certain new and useful Improvements in Current-Motors, of which the following is a specification.

My invention is an improvement in current motors, and has for its object to provide a motor of the character specified adapted to be arranged in any running stream, wherein a wheel is provided and means for supporting the same, the wheel being movable on the support to vary the depth of immersion of the working blades, and wherein adjustable mechanism is provided for deflecting the water from both sides toward the wheel.

In the drawings:

Figure 1 is a top plan view of the improved motor;

Fig. 2 is a section on the line 2—2 of Fig. 1, looking in the direction of the arrows adjacent to the line;

Fig. 3 is a rear view of one of the blades showing the tensioning mechanism in connection therewith.

In the present embodiment of the invention a pair of floats or scows 1 is provided, the said scows being arranged in spaced parallel relations, and they are connected by a species of platform 2 having intermediate its front and rear an opening in which the water wheel, to be described, is arranged. The front end of each scow is beveled at its inner corner, as shown at 3, inwardly toward the wheel, and leaves or wings 4 are adjustably mounted on these beveled corners, the said wings or leaves being movable vertically in a manner to be presently described.

A pair of inclined trackways 5 is connected with each scow, the members of each pair being at opposite sides of the scow, and each trackway is braced by an inclined brace 6. A slide 7 is mounted to move on each member of each pair, and each slide carries a bearing 8. These bearings are alined, and a shaft 9 is journaled in the four bearings, the shaft carrying the wheel between the scows.

A flexible member 10, as, for instance, a cord or cable, is connected with each slide at one end of the cord or cable and at the rear end of the slide, and each flexible member passes upwardly over a pulley 11 journaled in the upper end of the trackway or rail 5, and then downwardly to wind upon a reel 12 journaled in bearing arms 13 on the braces 6. Each of these reels may have any suitable mechanism connected therewith for turning the reel to wind up the flexible member and any suitable mechanism may be provided for preventing reverse movement of the reel under the weight of the shaft and water wheel.

The water wheel consists of a series of collars 13, the said collars or hubs being mounted on a sleeve 14 which has a peripheral cross section of polygonal form, being octagonal in the present instance, and the hubs or collars while movable freely longitudinally of the sleeve are constrained to rotate therewith. The sleeve may be keyed or otherwise secured to the shaft, and a series of radial arms 15 is secured to each collar, each series consisting of eight arms in the present instance.

The arms of the series are in register longitudinally of the shaft, and a blade 16 is secured to each set of registering arms. These blades are of a width to extend from the periphery of the sleeve 14 to the ends of the arms 15, and the arms of each set are braced against each other by flexible members 17, as, for instance, cords or the like, two series of flexible members being provided in the present instance. The arms of each set are connected by turn buckles 18 and 19, respectively. In the present instance there are four arms to each set and the two central arms are connected by the turn buckle 18. The two central arms are also connected to the outermost collars by the turn buckles 19.

Each leaf 4 has a pair of vertical slots 20 which register with openings in the beveled corners of the scows, and bolts 21 are passed through the registering openings, from the rear forwardly, each bolt being engaged by a nut 22 to adjustably connect the leaf with the scow. It will be evident that by loosening the nuts the leaves may be adjusted vertically, and each leaf is of considerable depth, as shown in Fig. 2, so that it may extend below the bottom of the scow, to deflect the flowing water inwardly toward the central line between the scow and into contact with the blades of the water wheel. Power is taken from the shaft 9 in any suitable or desired manner, as, for instance, by a pulley on the shaft. The float, consisting of the scows and the connecting platform 2, may be anchored or otherwise secured at any desired point in the stream, and when not in use the wheel may be drawn from out the water by means of the flexible members 10. The power of the wheel may be also varied by varying the depth of immersion of the working blades.

I claim:

In a current motor, a wheel consisting of a shaft, a series of hubs on the shaft, a sleeve rigid with the shaft and having a polygonal periphery, the hubs having openings fitting the sleeve, radial arms secured to the hubs, blades secured to the arms, and means for adjusting the hubs and arms toward each other, said means comprising turn buckles arranged between sundry of the arms and sundry of the hubs.

HENRY C. CANADAY.